Figure 1:
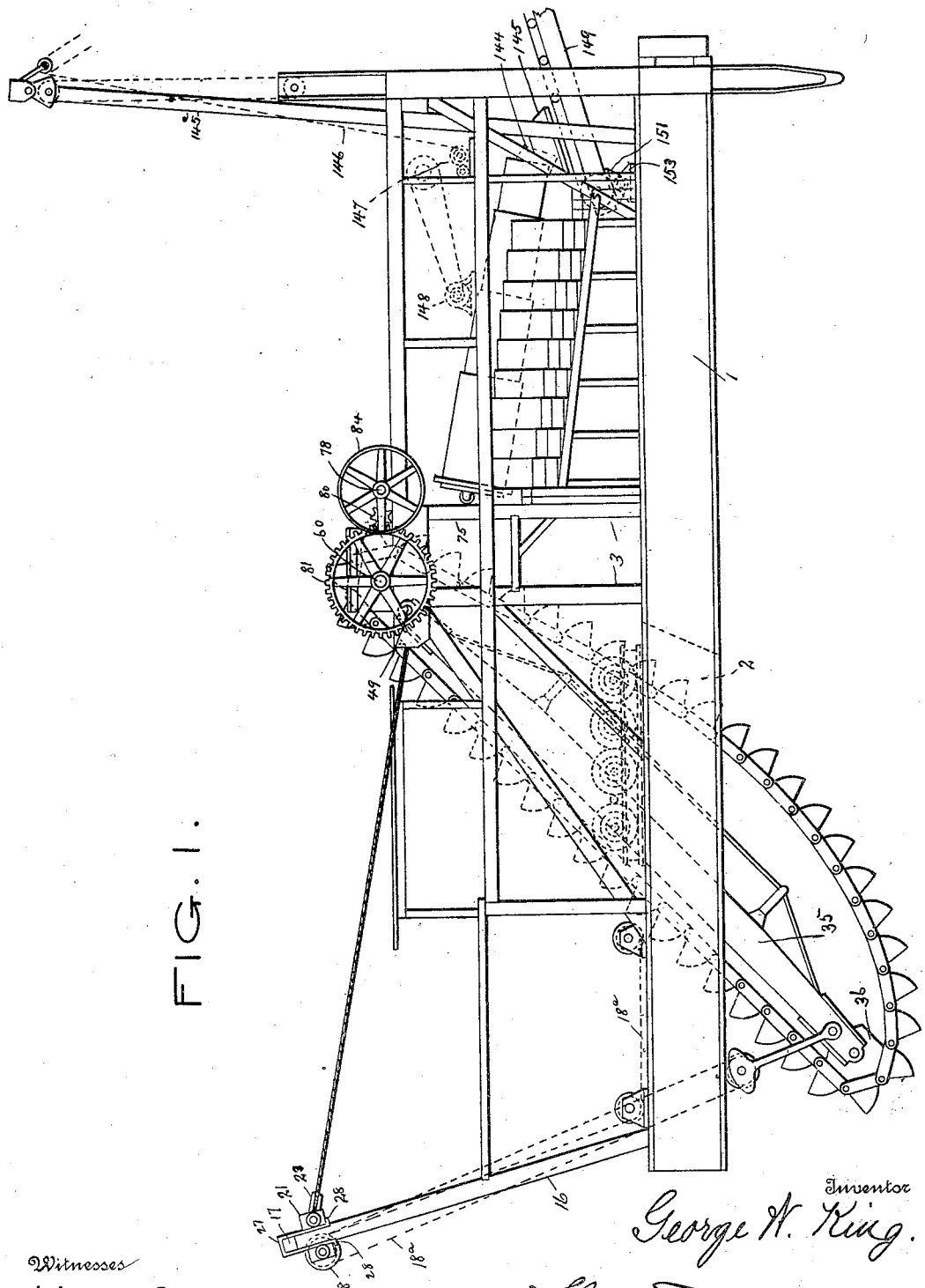

No. 836,118. PATENTED NOV. 20, 1906.
G. W. KING.
EXCAVATOR.
APPLICATION FILED JUNE 18, 1906.

8 SHEETS—SHEET 2.

Witnesses
William F. Bauer.
H. L. Hammaker.

Inventor
George W. King.
By
Attorney

No. 836,118. PATENTED NOV. 20, 1906.
G. W. KING.
EXCAVATOR.
APPLICATION FILED JUNE 18, 1906.

8 SHEETS—SHEET 3.

Witnesses
William F. Bauer
H. L. Hammaker

Inventor
George W. King.
By H. A. Toulmin
Attorney

No. 836,118. PATENTED NOV. 20, 1906.
G. W. KING.
EXCAVATOR.
APPLICATION FILED JUNE 18, 1906.
8 SHEETS—SHEET 4.
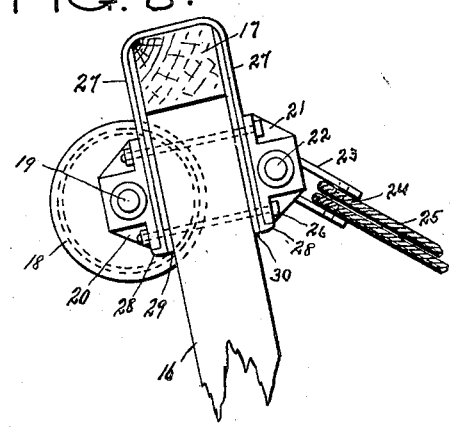
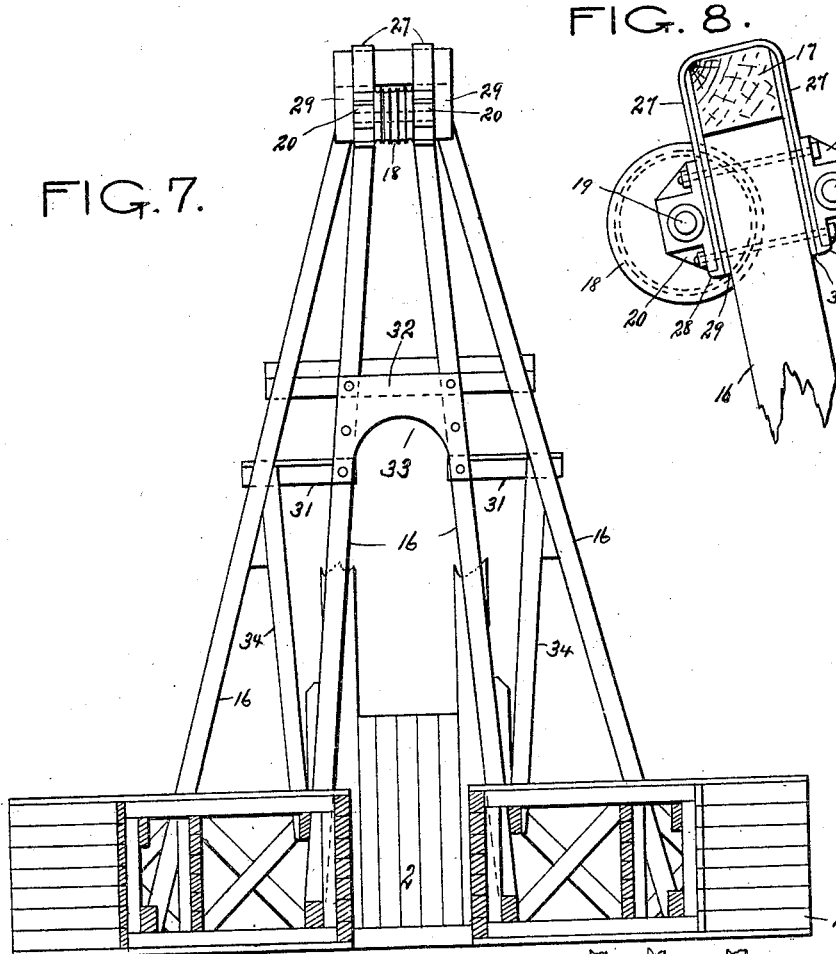
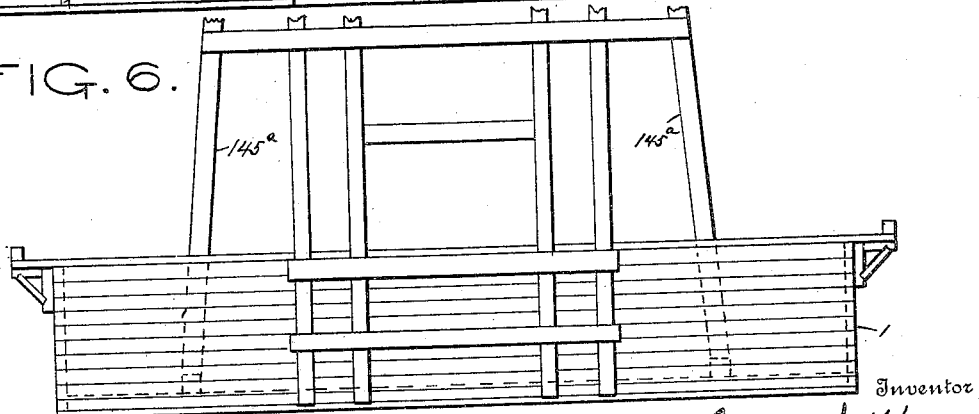
Witnesses
William F. Bauer.
H. L. Hammaker.
Inventor
George W. King.
By H. A. Toulmin,
Attorney No. 836,118.

PATENTED NOV. 20, 1906.

G. W. KING.
EXCAVATOR.
APPLICATION FILED JUNE 18, 1906.

8 SHEETS—SHEET 5.

Witnesses
William F. Bauer.
H. L. Hammaker.

Inventor
George W. King.
By H. A. Toulmin
Attorney

No. 836,118.  
PATENTED NOV. 20, 1906.  
G. W. KING.  
EXCAVATOR.  
APPLICATION FILED JUNE 18, 1906.  
8 SHEETS—SHEET 6.

Witnesses  
William F. Bauer.  
H. L. Hammaker

Inventor  
George W. King.  
By H. A. Toulmin  
Attorney

No. 836,118. PATENTED NOV. 20, 1906.
G. W. KING.
EXCAVATOR.
APPLICATION FILED JUNE 18, 1906.

8 SHEETS—SHEET 7.

Witnesses
William F. Bauer
L L Hammaker

Inventor
George W. King
By H. A. Toulmin,
Attorney

No. 836,118. PATENTED NOV. 20, 1906.
G. W. KING.
EXCAVATOR.
APPLICATION FILED JUNE 18, 1906.
8 SHEETS—SHEET 8.
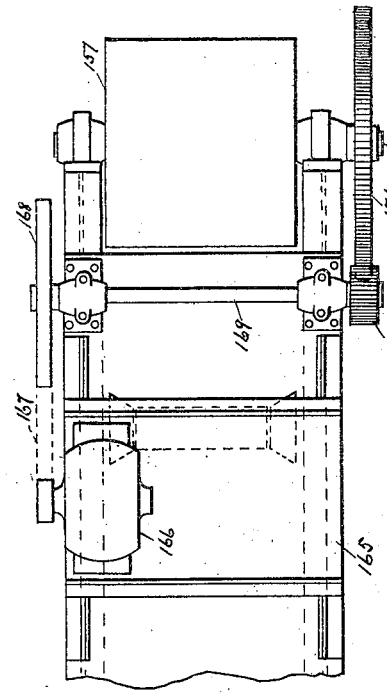
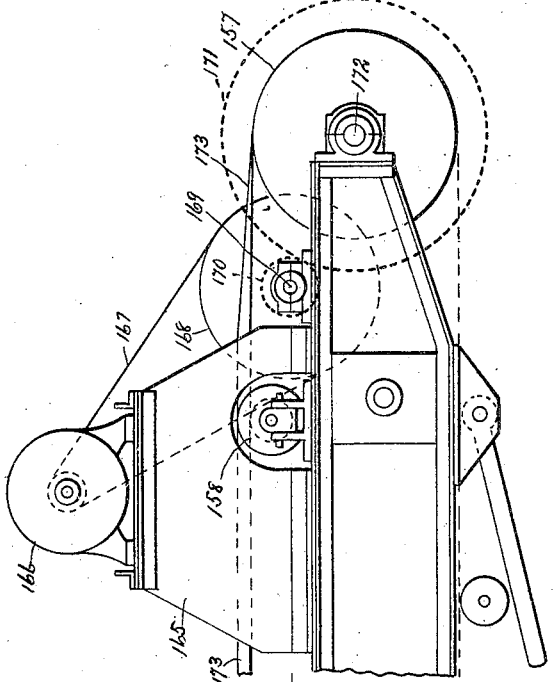
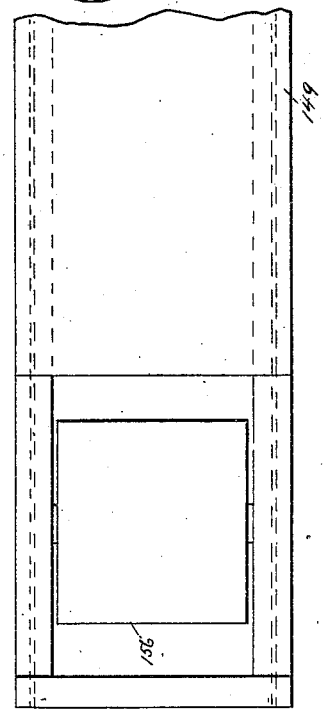
Witnesses
William F. Bayer
H. L. Hammaker
Inventor
George W. King
By H. A. Toulmin
Attorney

UNITED STATES PATENT OFFICE.

GEORGE W. KING, OF MARION, OHIO, ASSIGNOR TO THE MARION STEAM SHOVEL COMPANY, OF MARION, OHIO, A CORPORATION OF OHIO.

EXCAVATOR.

No. 836,118.   Specification of Letters Patent.   Patented Nov. 20, 1906.

Application filed June 18, 1906. Serial No. 322,248.

*To all whom it may concern:*

Be it known that I, GEORGE W. KING, a citizen of the United States, residing at Marion, in the county of Marion and State of Ohio, have invented certain new and useful Improvements in Excavators, of which the following is a specification, reference being had therein to the accompanying drawings.

This invention relates to excavators, the features being designed more particularly for use in connection with dredges, especially mining-dredges, although capable of use in other connections.

The objects are, first, to provide an improved construction of the front gantry-frame of such dredges, whereby it is rendered more compact and stronger and whereby the parts mounted thereon are more efficiently supported; second, an improved construction of the "ladder" so called which supports the endless chain of buckets forming the excavator proper; third, a construction of the main gantry-frame, its housing, or receiving-pocket and the mounting of the various operative parts thereon which gives superior compactness and strength, the various structural elements being especially constructed and arranged to properly meet and distribute the strains to which they are subjected in use; fourth, an improved construction of the structure which receives the discharge from the buckets and delivers it to the screen or grizzly, whereby superior durability and efficiency are obtained; fifth, certain improvements in the mounting, driving, and tensioning of the stacker which handles the waste material received from the grizzly or primary separator and delivers the same at a distant point of discharge. The particular features of novelty will be hereinafter more fully described and then particularly pointed out in the claims.

Figure 2:
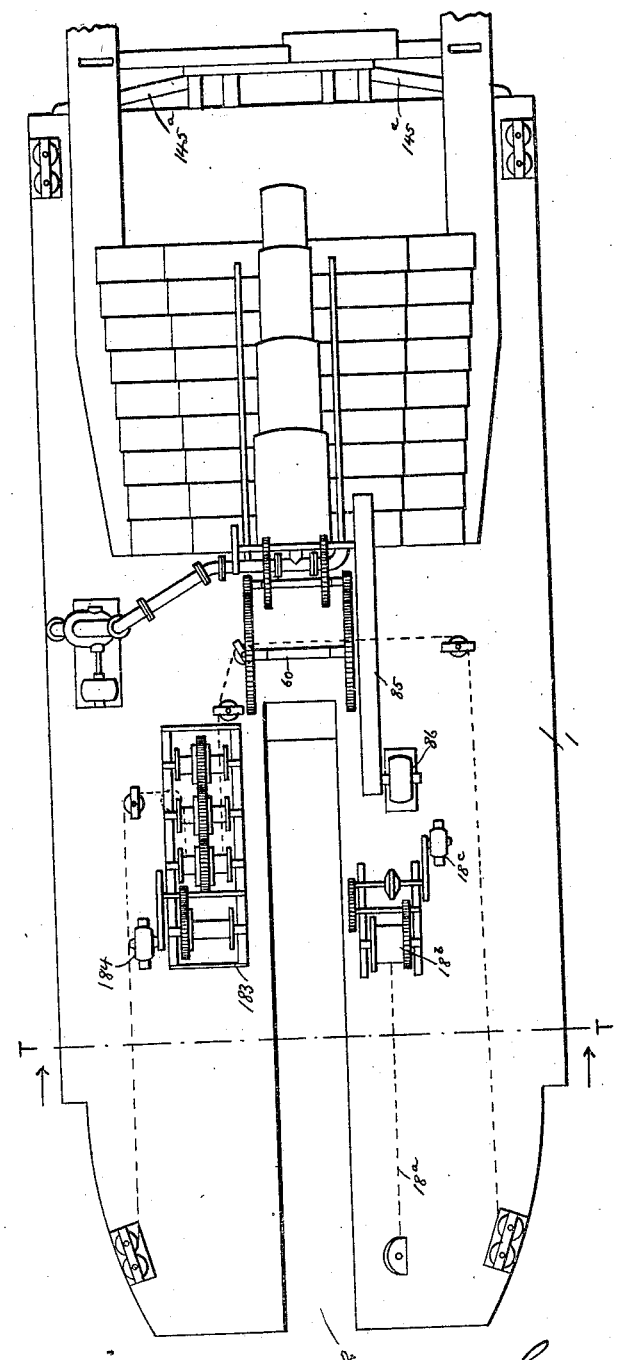
Figure 3:
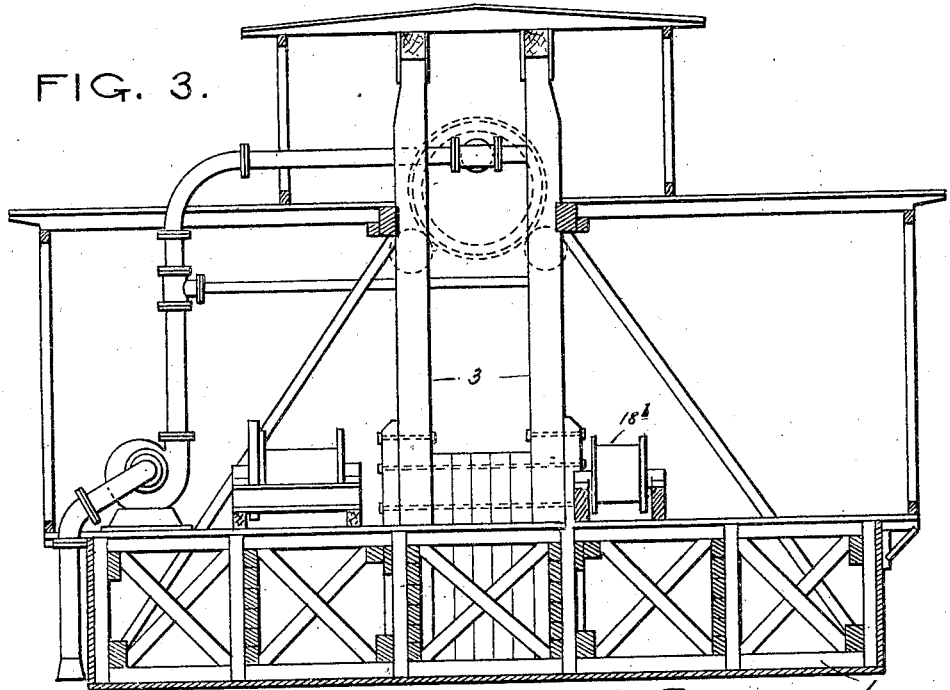
Figures 4, 5:
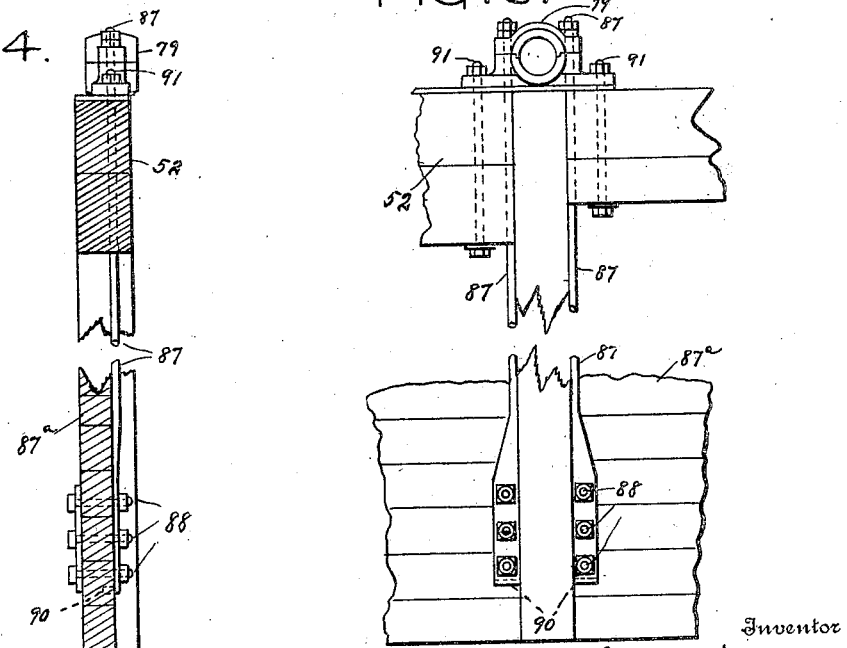
Figure 9:
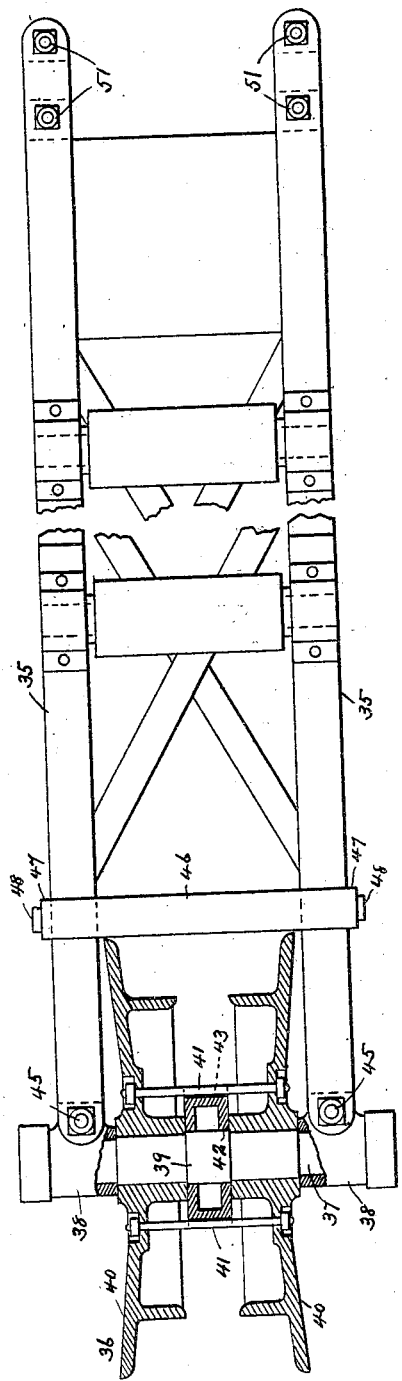
Figure 10:
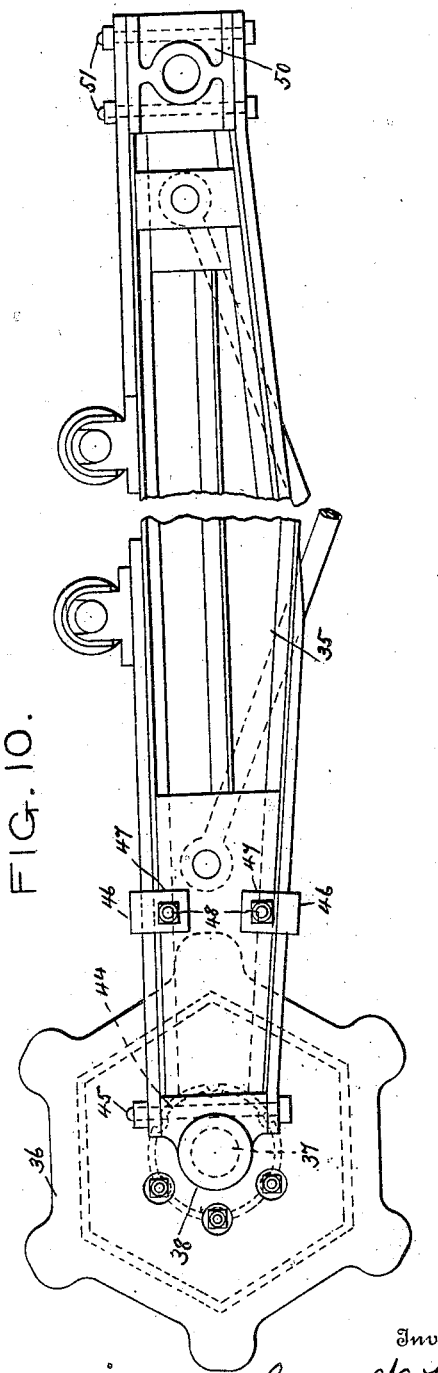
Figure 11:
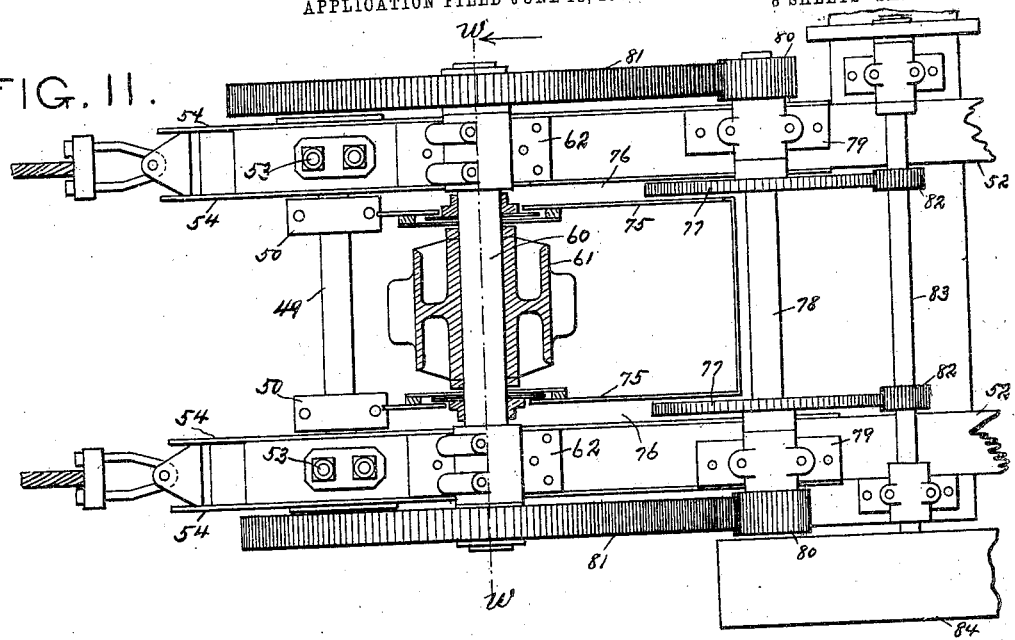
Figure 12:
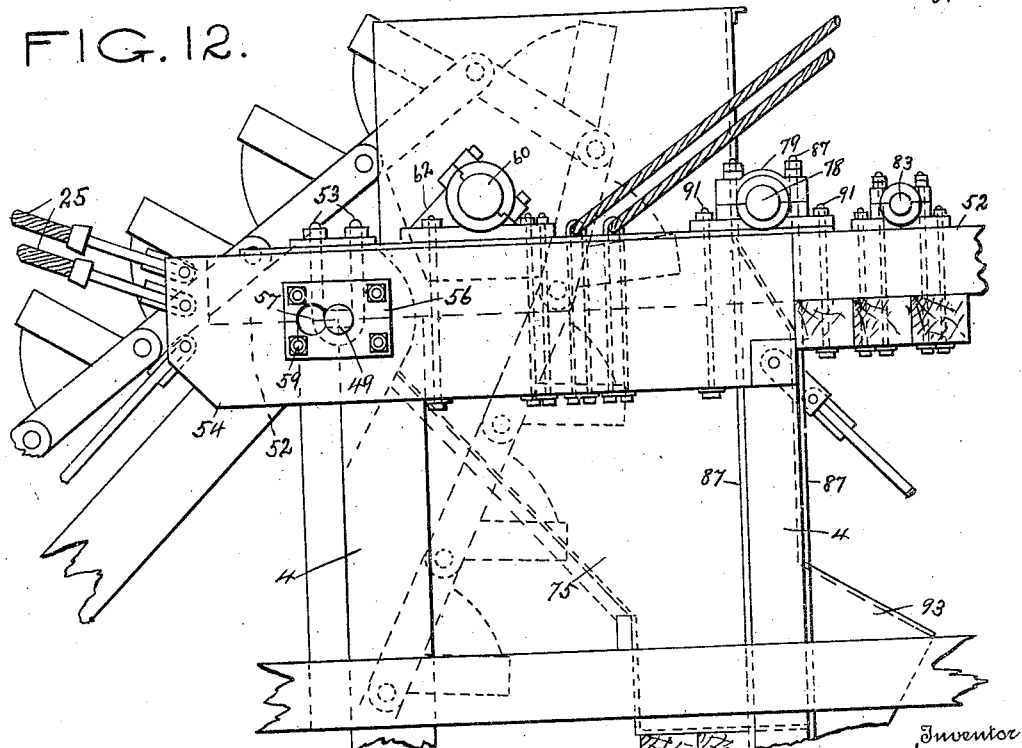
Figure 13:
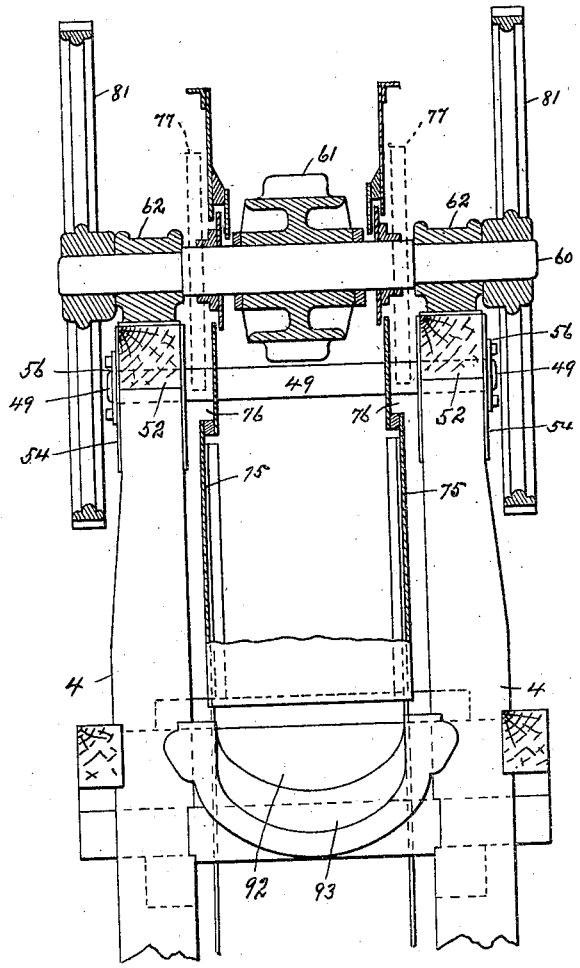
Figures 14, 15:
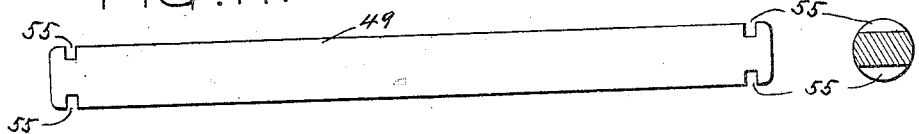
Figure 16:
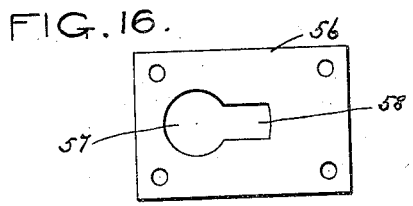

In the accompanying drawings, Figure 1 is a side elevation of a structure embodying my invention in one form. Fig. 2 is a plan view of the same. Fig. 3 is a transverse sectional view taken on the line *t t* of Fig. 2 and looking in the direction of the arrows. Figs. 4 and 5 are detail views illustrating the construction whereby the bearings of the counter-shaft from which the bucket-chain is driven are secured in position. Fig. 6 is a rear view showing the lower portion of the rear gantry-frame. Fig. 7 is a front elevation showing the front gantry-frame and the lower part of the main gantry-frame. Fig. 8 is an enlarged detail side elevation of the upper end of the front gantry-frame. Fig. 9 is a detail plan view, partly in section and partly broken away, of the ladder which supports the endless chain of buckets. Fig. 10 is a side elevation of what is shown in Fig. 9. Fig. 11 is a plan view, partly in section, of the upper part of the main gantry-frame and the mechanism mounted thereon. Fig. 12 is a side elevation of the same. Fig. 13 is a transverse sectional view of the same taken on the line *w w* of Fig. 11 and looking in the direction of the arrows. Fig. 14 is a detail view of the hanger-shaft which supports the ladder detached. Fig. 15 is a detail sectional view taken through the recessed portion of Fig. 14. Fig. 16 is a detail elevation of one of the locking-plates for securing the hanger-shaft in position, detached. Fig. 17 is a top plan view of the stacker. Fig. 18 is a side elevation of the same; and Fig. 19 is an end view, partly in section, of the lower end thereof.

The accompanying drawings illustrate a dredge embodying my invention in one form. The general structure and mode of operation of these dredges is well known and requires no description, and I shall therefore proceed to describe in detail the several features of novelty to which I have already referred.

The dredge comprises a hull 1, which is provided with a crotch or well-opening 2, extending from the central portion of the hull to and through the front end thereof. At the rear end of this well-opening there is located the main gantry-frame 3, which supports the ladder of the endless chain of excavating-buckets and the mechanism whereby is it driven.

Considering that feature of my invention which relates to the construction of the front gantry-frame, the same is shown more particularly in Figs. 7 and 8. The main component elements of said frame are upright members 16, mounted at the front end of the hull and forwardly inclined. These members are also inclined toward each other so as to converge toward their upper ends, the two members on each side being united at their upper ends and all four members being connected by a relatively short transverse member or head-block 17. This construction gives great compactness and increased strength, particularly at the point where the front gantry-frame receives the sheaves 18, over which passes the rope or cable 18$^a$, which supports and raises and lowers the free end of the excavator-ladder by means of a hoist 18$^b$, driven by a motor 18$^c$. The sheaves 18 are mounted on a shaft 19, which is supported in boxes 20, mounted on the front of the frame. Similar boxes 21, mounted on the back of said frame opposite the boxes 20, receive and support a shaft or bearing-pin 22, to which is connected a clevis 23, which carries a sheave 24, this latter receiving the cables 25, which extend back and are secured to the main gantry-frame 3, and thus serve to support the upper end of the front gantry-frame. The boxes 20 and 21 are connected to each other by bolts 26, which pass through both boxes and through the frame members. In connection with each pair of boxes 20 and 21 I provide a strap or stirrup-iron 27, which fits over the top of the frame and passes down on each side thereof between the boxes and frame, terminating at its lower end in an outwardly-extending flange or projection 28, on which the lower end of the corresponding box rests. I prefer to employ, in connection with this part of the structure, plates 29, one of which is mounted on each side of the head of the frame at the front thereof, being interposed between the straps 27 and the timbers of which the frame is composed. A single similar plate 30 is secured to the rear face of the head of the frame between the straps and timbers. By reason of this construction the head of the frame is greatly strengthened and the parts mounted thereon are more firmly supported, the construction being at the same time relatively inexpensive. In order to further strengthen this frame, the members thereof are connected by the usual cross-pieces 31, and in addition thereto the two inner members are connected at the lowest point permissible by a plate 32, secured to said members at its lateral edges and cut away centrally, as indicated at 33, to permit the bucket-line to pass below the same, said plate thus bracing and supporting the frame members at the lowest possible point. The two members on each side are additionally connected and braced by means of outwardly-diverging uprights 34.

Considering next those features of my invention which relate to the construction of the ladder, (shown more particularly in Figs. 9 and 10,) said ladder comprises the usual parallel arms or members 35, supporting at their lower ends the tumbler 36, around which the line of buckets passes. This tumbler is shown more particularly in Fig. 9 and is mounted upon a shaft 37, rotating in bearings 38 at the lower end of the ladder. The shaft is provided with a central enlargement or collar 39, forming shoulders against which the cheek-pieces 40, which form the body of the tumbler, abut, being held against the same by means of bolts 41, which connect the cheek-pieces. Between said cheek-pieces there is loosely mounted on the shaft 37 a sleeve-like casting 42, having in its periphery transverse grooves or seats 43 to receive the bolts 41. The object of this construction is to support the central part of the bolts and protect the same against injury, as they would otherwise be liable to be bent or broken by stones or boulders, which might be crowded in between the cheek-pieces to a distance sufficient to strike these bolts. The bearing-boxes 38 of the shaft 37 are fitted between the top and bottom members of the corresponding arms 35 and are provided with apertures 44 to receive bolts 45, which pass through the said bearing-boxes and the top and bottom members of the arms, thus securing the boxes in position. To prevent the arms from separating laterally at their lower ends they are connected both at the top and bottom by clamping or tie pieces 46, which have their ends bent at right angles, as indicated at 47, so as to fit against the outer sides of the arms and prevent their separation. They are secured in position by bolts 48, which may pass entirely through the ladder from side to side or only through the arms or girders at each end of the clamping or tie pieces.

At its upper end the ladder is pivotally supported on a hanger-shaft 49, which is mounted in the main gantry-frame in the manner hereinafter described. Each girder or arm of the ladder has its upper and lower members extended at its upper end, and there is fitted between said extensions a bearing-box 50, which is preferably a solid box. These boxes are secured in position by bolts 51, which pass through suitable apertures in the top and bottom members of the girder and also through suitable apertures in the boxes 50. By reason of this construction solid boxes may be employed, since the boxes can be slipped onto the hanger-shaft before this latter is mounted in its supports, the ladder being subsequently connected to the boxes. Furthermore, the ladder can readily be disconnected by removing the bolts 51, thus avoiding the necessity of removing the hanger-shaft from its supports. This is of material advantage for the reason that it permits the hanger-shaft to be placed in position and removed when free from the weight of the ladder. The hanger-shaft is supported by longitudinal top members 52 of the main gantry-frame, under which it passes, being preferably recessed into the same, as shown in dotted lines in Fig. 12, and being clamped in position by means of U-bolts 53 at each end. Said hanger-shaft also extends through the side plates 54, which are secured to the outer sides of the members 52, and the projecting ends of said shaft are slotted transversely on opposite sides, as shown at 55 in Figs. 14 and 15. For each end of the shaft there is provided a locking-plate 56. (Shown in detail in Fig. 16.) Said plate is provided with an aperture 57 of a size sufficient to pass over the shaft 49, said aperture communicating with a slot 58, the width of which is equal to the distance separating the bottom walls of the slots 55. These plates are slipped over the ends of the hanger-shaft until they register with the slots 55, in which position they bear against the side plates 54 and are then moved laterally, so as to engage the slots 55 with the edges of the slots 58, in which position they are secured to the frame by bolts 59. This provides an additional securing device for the hanger-shaft and serves to positively prevent said shaft from turning. Either the U-bolts or these locking-plates or both of said securing means may be used to secure the hanger-shaft in position. In any case said hanger-shaft acts as a substantial brace between the two members of the gantry-frame, the securing devices serving not only to prevent the shaft from turning, but also to prevent the members of the gantry-frame from spreading or being crowded together. This bracing of the frame at this point is of great advantage for the reason, among others, that it relieves the upper tumbler-shaft 60, which is a revolving shaft carrying the upper tumbler 61, from a great deal of end strain and end friction, said tumbler-shaft being mounted in bearings 62 on the frame members 52. Since the hanger-shaft 49 is slotted on both sides, and since the wear on said shaft is chiefly on one side only, the construction is such that said shaft may be readily turned half-way round when worn, thereby bringing the unworn part thereof into position to receive the strain.

The gantry-frame supports a housing or pocket 75, preferably of sheet metal, into which the buckets discharge their contents. Ordinarily this housing is bolted directly to the inner sides of the gantry-frame members, leaving no space between said frame and housing. I so construct the frame and housing that the latter is supported at its lower portion from the former, a space being left between the frame and housing on each side at the top, as shown at 76. These spaces receive gear-wheels 77, which are mounted on a counter-shaft 78, supported in bearing-boxes 79 on the top of the frame members 52. The ends of the counter-shaft 78 project beyond the bearing 79 and are provided with pinions 80, which mesh with gear-wheels 81 on the upper tumbler-shaft 60. The gear-wheels 77 mesh with pinions 82 on a driving-shaft 83, to which power is applied in any suitable manner—as, for instance, by means of a pulley 84—driven by a belt 85 from a motor 86 on the hull. Heretofore the gears 77 have necessarily been mounted on the outer extremities of the shaft 78, outside of the pinions 80, thus requiring additional boxes and supports for the ends of said shaft outside of said gears. By providing spaces between the housing and frame members for the gears 77 I am enabled to bring these gears inside of the frame members and close to the bearings 79, thus providing a much stronger and simpler construction of the parts.

It will be noted that the shaft 78 revolves in a direction such that the pinions 80 have a tendency to climb upon the main gears 81, thereby causing a heavy lifting strain upon the bearing-boxes 79. In order to effectually resist this strain and at the same time strengthen the frame, I secure the bearing-boxes 79 by means of bolts 87, which extend down through the boxes and frame members 52, and thence down to the hull or body of the boat, where they are secured to the body-timbers, bulkheads, or "gunnels," so called, 87$^a$. Here the end of each bolt is flattened to receive fastening-bolts 88, which pass through the flattened end and through the timbers of the hull. The end of each bolt 87 is further bent to form a toe or projection 90, which is embedded in the timbers to more firmly connect it to the same. It will be understood, of course, that the bolts 87 are the bolts which serve to connect the upper part of the bearing-box to the lower part, said lower part being secured to the member 52 by the usual bolts 91. This construction is shown in detail in Figs. 4 and 5.

The housing 75 is provided at its rear lower portion with a discharge-opening 92 and a dump-chute 93, by means of which the material is discharged into the primary separator or grizzly.

The heavy material which passes out at the open lower end of the grizzly is received by a stacker or conveyer, which carries it away and delivers it at a distance from the dredge, a chute 144 and hopper 145 being interposed between the grizzly and stacker, as indicated in Fig. 1. This stacker is pivotally supported on the hull at its inner end, its outer end being supported from the rear gantry-frame 145$^a$ and raised and lowered by a cable 146 and hoisting-drum 147, driven from a motor 148. The stacker (indicated as a whole by the reference-numeral 149) is pivotally connected to the hull at its inner end by the following construction: Each girder 150 of the stacker has secured to its under side a journal-casting 151, having an aperture 152 formed therethrough. On the hull 1 there are securely fastened castings 153, having upwardly-extending lugs 154, which receive between them the apertured casting 151 and which are also apertured, a journal-pin 155 passing through all three parts, as shown in Fig. 19. This construction affords a simple and inexpensive connection between the stacker and hull, avoiding the heavy and expensive castings usually employed, made large enough to receive the entire end of the stacker, which is rounded off to seat in the casting and is connected by a hinge-pin passed entirely through the casting and girder at about midway of the height of the girder.

The stacker comprises a conveyer-belt passing over large pulleys 156 and 157 at the ends of the stacker and supported by intermediate small pulleys or rollers 158. In order to give this belt the necessary tension, the inner pulley 156 has its bearing-boxes 159 mounted to slide in ways 160 on the outer sides of the girders, which are slotted, as shown at 161, for the passage of the pulley-shaft. Each box 159 is provided with a downward extension 162, into which is threaded an adjusting-screw 163, the projecting end of which is formed to receive a suitable means for rotating said screw and is provided with a collar 164, which bears against the end of the guideway and limits the movement of the screw toward the outer end of the stacker. This forms an efficient adjusting mechanism for so moving the pulley as to take up the slack of the conveyer-belt, said adjusting mechanism being located at the inner end of the stacker, where it is readily accessible.

It is desired that the conveyer-belt of the stacker should be driven by the pulley at its outer end so as to keep the load-bearing upper portion thereof under tension. I effect this result by mounting on a suitable support 165 on the outer end of the stacker a motor 166, which by a belt 167 drives a pulley 168 on a shaft 169. This shaft is provided with a pinion 170, which meshes with a gear 171 on the shaft 172 of the outer pulley 157. The conveyer-belt is indicated at 173. By reason of this construction the desired tension of the upper part of the belt is maintained, and the stacker can be readily raised and lowered by the mechanism provided for that purpose without affecting the relations between the stacker-belt and the motor by which it is driven.

In addition to the structural features hereinbefore referred to the apparatus comprises, of course, the necessary structural features and mechanisms required in a dredge of this character. I have shown at 183 a winch, whereby the head-line, the four fleeting lines, arranged in pairs at the front and rear of the hull at the sides thereof, and the spud-lines are controlled and operated, being driven by a motor 184. Preferably the various motors are electric motors, although it is obvious that any suitable source of power may be employed. The general operation of the dredge is well known and requires no description, while the operation of the specific novel features hereinbefore referred to has been fully described in connection with the detailed description of their construction.

I wish it to be understood that I do not desire to be limited to the exact details of construction shown and described, for obvious modifications will occur to a person skilled in the art.

Having thus fully described my invention, what I claim as new, and desire to secure by Letters Patent, is—

1. In a dredge of the character described, a front gantry-frame comprising upwardly-extending and forwardly-inclined members straddling the crotch of the hull, said members converging at their upper end to form a head to receive the ladder-supporting sheave, substantially as described.

2. In a dredge of the character described, the combination, with a hull having a crotch or well-hole, of a front gantry-frame comprising upwardly-extending and forwardly-inclined members arranged in pairs on opposite sides of the crotch, the members of each pair converging and uniting at their upper ends, the two pairs also converging toward their upper ends and having a space between them to receive the ladder-supporting sheave, and a transverse head-block to which all of said members are united, substantially as described.

3. In a dredge of the character described, a front gantry-frame composed of upwardly-converging members united at their upper ends to form a head, a sheave-shaft provided with boxes mounted on the front of said head, a clevis-shaft provided with boxes mounted on the rear of said head, and through-bolts passing through said head and boxes to secure the latter in position on the head, substantially as described.

4. In a dredge of the character described, a front gantry-frame composed of upwardly-converging members united at their upper ends to form a head, a sheave-shaft provided with boxes mounted on the front of said head, a clevis-shaft provided with boxes mounted on the rear of said head, and through-bolts passing through said head and boxes to secure the latter in position on the head, in combination with straps or stirrup-irons fitting over the head, passing between the head and boxes, and provided with projecting flanges or toes at their lower ends on which the boxes rest, substantially as described.

5. In a dredge of the character described, a front gantry-frame composed of upwardly-converging members united at their upper ends to form a head, a sheave-shaft provided with boxes mounted on the front of said head, a clevis-shaft provided with boxes mounted on the rear of said head, and through-bolts passing through said head and boxes to secure the latter in position on the head, in combination with straps or stirrup-irons fitting over the head, passing between the head and boxes, and provided with projecting flanges or toes at their lower ends on which the boxes rest, and plates fitting the faces of said head and located between the stirrup-irons and head proper, substantially as described.

6. In a dredge of the character described, a front gantry-frame comprising upwardly-converging members straddling the crotch or well-hole of the hull, transverse braces connecting said upright members, and a plate secured to and connecting the inner members and recessed or cut away at its lower portion to accommodate the bucket-chain, substantially as described.

7. In a dredge of the character described, the combination, with a hull having a crotch or well-hole, of a front gantry-frame comprising upwardly-converging members arranged in pairs on opposite sides of the crotch, and upwardly-diverging braces connected at their upper ends to the outer converging members of the frame, substantially as described.

8. In a dredge of the character described, a lower tumbler or spool for the bucket-chain comprising a shaft, a tumbler proper comprising separated cheek-pieces and transverse bolts connecting the same, and a sleeve mounted on the shaft between the cheek-pieces and provided with seats to receive the central portions of the connecting-bolts to protect the same from injury, substantially as described.

9. In a dredge of the character described, a spool or tumbler for the lower end of a bucket-chain comprising a rotating shaft having a central collar, a body composed of separated cheek-pieces mounted to rotate with the shaft, transverse bolts connecting said cheek-pieces and drawing them against the ends of the shaft-collar, and a casting loosely mounted on said shaft-collar between the cheek-pieces and provided with transverse peripheral grooves forming seats to receive the central portions of the connecting-bolts, substantially as described.

10. In a dredge of the character described, a ladder comprising parallel arms or side members provided with bearings at their lower ends, a shaft mounted to rotate in said bearings and carrying a spool or tumbler, and transverse tie-pieces extending across the ladder and having their ends bent to engage the members on the outside thereof and bolted thereto immediately back of the tumbler or spool, substantially as described.

11. In a dredge of the character described, the combination, with a ladder having bearing-boxes removably secured to the upper ends of its arms or members, of a fixed hanger-shaft adapted to receive said boxes, and a supporting-frame in which said hanger-shaft is removably mounted, substantially as described.

12. In a dredge of the character described, the combination, with a ladder having bearing-boxes removably secured to the upper ends of its arms or members, of a fixed hanger-shaft adapted to receive said boxes, and a supporting-frame in which said hanger-shaft is removably mounted, said boxes being integral or solid, substantially as described.

13. In a dredge of the character described, a gantry-frame comprising separated lateral members, a shaft rotating in bearings thereon and carrying the upper bucket-chain tumbler, a ladder having bearing-boxes removably secured to its upper end, and a non-rotating hanger-shaft having its ends removably secured to the said gantry-frame members in front of the tumbler-shaft, substantially as described.

14. In a dredge of the character described, a ladder provided with removable bearing-boxes at its upper end, in combination with a gantry-frame comprising separated longitudinally-extending members, a fixed hanger-shaft to receive the bearing-boxes, and U-bolts passing through the frame members, embracing the end portions of the hanger-shaft, and clamping the same against the frame members, substantially as described.

15. In a dredge of the character described, the combination, with a ladder provided at its upper end with removable bearing-boxes, of a fixed hanger-shaft adapted to receive said boxes and transversely grooved or slotted on opposite sides near each of its ends, a supporting-frame comprising separated members through which the ends of the hanger-shaft project, and locking-plates having apertures to pass over the ends of the shaft and slots to fit the grooved portions thereof, said plates being provided with means whereby they are secured to the supporting-frame, substantially as described.

16. In a dredge of the character described, a gantry-frame having separated longitudinally-extending members provided with side plates, in combination with a fixed hanger-shaft for the bucket-ladder extending through said side plates and having its projecting ends grooved on opposite sides, locking-plates removably secured to the side plates and provided with apertures to fit the hanger-shaft and with slots to fit the reduced slotted portions thereof, and U-bolts embracing the hanger-shaft and passing through the longitudinal members to clamp the shaft against the same, substantially as described.

17. In a dredge of the character described, a gantry-frame comprising laterally-separated members, a housing or pocket located between said members and separated from the same so as to leave an open space at each side at the top, a driving-shaft and a bucket-chain tumbler-shaft mounted transversely on said frame members, the latter shaft being provided with gear-wheels on its overhanging ends outside of the frame members, and a counter-shaft also mounted transversely on said frame members, provided with pinions on its overhanging outer ends to mesh with said gears, and provided with gears arranged in the spaces between the frame members and housing, the driving-shaft being provided with pinions meshing with said gears, substantially as described.

18. In a dredge of the character described, an elevated gantry-frame having mounted thereon a tumbler-shaft for the bucket-chain provided with gears, a counter-shaft having pinions meshing with said gears, divided bearing-boxes mounted on the top of said frame to receive the counter-shaft, and connecting-bolts for the upper parts of said boxes extending downward through said boxes and the gantry-frame and having their lower ends secured to the hull-timbers, substantially as described.

19. In a dredge of the character described, an elevated gantry-frame having mounted thereon a tumbler-shaft for the bucket-chain provided with gears, a counter-shaft having pinions meshing with said gears, divided bearing-boxes mounted on the top of said frame to receive the counter-shaft, and connecting-bolts for the upper parts of said boxes extending downward through said boxes and the gantry-frame and having their lower ends secured to the hull-timbers, the lower end of said bolts being flattened and bent to form toes or projections engaging the hull-timbers, and other bolts passing through said hull-timbers and the flattened portions of said bearing-bolts, substantially as described.

20. In a dredge of the character described, a hull provided with bearing-lugs secured thereon, in combination with a stacker having journal-castings secured to the under side of its girder members and adapted to fit between the bearing-lugs, and journal-pins passing through said lugs and castings, substantially as described.

21. In a dredge of the character described, a stacker comprising a frame pivotally connected to the hull, a conveyer-belt, an idle pulley at the inner end of said frame, and a driving-pulley at the outer end of said frame, around which pulleys said belt passes, and a motor mounted on said frame adjacent to the driving-pulley and operatively connected therewith, substantially as described.

22. In a dredge of the character described, a stacker comprising a frame pivotally connected to the hull, a conveyer-belt, an idle pulley at the inner end of said frame, and a driving-pulley at the outer end of said frame, around which pulleys said belt passes, and a motor mounted on said frame adjacent to the driving-pulley and operatively connected therewith, the idle pulley being provided with means whereby it may be adjusted on the frame to tension the belt, substantially as described.

In testimony whereof I affix my signature in presence of two witnesses.

GEORGE W. KING.

Witnesses:
ROBERT G. LUCAS,
CARL T. BAUMAN.